US005566239A

United States Patent [19]
Garcia et al.

[11] Patent Number: 5,566,239
[45] Date of Patent: Oct. 15, 1996

[54] FLOATING DIGITAL LOOP CARRIER TELEPHONE INTERFACE

[75] Inventors: Frank X. Garcia, Aurora; Van Nguyen, Wheaton, both of Ill.

[73] Assignee: Teltrend, Inc., St. Charles, Ill.

[21] Appl. No.: 255,176

[22] Filed: Jun. 7, 1994

[51] Int. Cl.⁶ .................................................. H04M 3/00
[52] U.S. Cl. ........................ 379/399; 379/242; 379/219
[58] Field of Search ................................ 379/93, 284, 10, 379/30, 6, 15, 378, 399, 29, 5, 90, 242, 219; 340/825

[56] References Cited

U.S. PATENT DOCUMENTS

| | | | |
|---|---|---|---|
| 4,438,298 | 3/1984 | Rubin | 379/29 |
| 4,562,436 | 12/1985 | Coleman et al. | 340/825 |
| 4,645,874 | 2/1987 | Fildes | 379/93 |
| 5,315,644 | 5/1994 | Lester et al. | 379/399 |
| 5,408,524 | 4/1995 | Reum | 379/399 |

*Primary Examiner*—Krista M. Zele
*Assistant Examiner*—Scott Wolinsky
*Attorney, Agent, or Firm*—Banner & Allegretti, Ltd.

[57] ABSTRACT

A digital loop carrier system that more conveniently passes a flash-hook signal while still allowing open-switching-intervals (loop current feed open intervals) with a floating ground central office switch interface. The carrier system includes both an office loop and a customer loop. The interface includes both an office loop switch and controller. The controller regulates the operation of the switch and also regulates whether the customer loop should be open or closed. When the office loop is not grounded, but current was detected by the controller in the office loop prior to the controller opening the office loop, the controller waits a predetermined interval after opening the office loop before opening the customer loop and terminating the call.

6 Claims, 3 Drawing Sheets

FLOATING DIGITAL LOOP CARRIER TELEPHONE INTERFACE

BACKGROUND OF THE INVENTION

The present invention relates generally to digital loop carrier systems and, more particularly, the invention relates to an interface for a digital loop carrier telephone system in which an analog loop within the system is allowed to have a floating ground reference.

Digital loop carrier systems fall under the general category of "carrier systems, subscriber loop." Thus, digital loop carriers ("DLCs") transport telephone services for residential and business communications.

Subscriber loop carrier systems apply basic carrier system principles to increase circuit carrying capacity of a single transmission media through multiplexing techniques. The transmission media for subscriber loop carrier systems has historically been copper loop feeder cables, although there is now an increasing use of fiber optic cables.

A digital telecommunications transmission facility may include a central office terminal (or "COT"), remote terminal (or "RT"), and customer premises equipment. The COT may transmit the digital data signals over digital transmission lines to the RT and, thereafter, to the customer premises equipment. Repeaters may be required on the facility between the COT and RT to regenerate the high frequency carrier signal.

The RT is generally connected to a short length of copper feeder cable for distribution of the derived carrier channels. Subscriber loop carrier systems are often referred to as pair gain systems because the telephone company assigns additional subscriber feeder pairs available for service assignment.

Typically, signals are sent from the COT to a RT over transmission lines differentially over two pairs of cables. The Bell telephone system in the United States, for example, has widely utilized digital "D" multiplexing code modulation systems. One pair of cables is provided for each direction of transmission.

Data within the central office may be communicated, via an analog loop, from a central office switch to a central office terminal. The central office terminal receives the signal from the central office switch and multiplexes a signal for transmission on the digital line to the remote terminal. The digital data is then converted to an analog signal and then provided by the remote terminal to the customer premises on another tip-ring conductor pair.

The analog loop within the central office may include a tip-ring pair. The tip may be connected, for example, to the positive side of a 48 volt battery or other substantially direct current power sources. The tip of the central office loop may be interconnected to a fixed ground reference. Thus if the battery, or other power supply employed by the central office, is, for example, at 48 volts, the ring lead would be at an electrical potential of −48 volts with respect to the ground the general fixed ground reference. If the tip is not tied to a fixed ground reference, however, (which may occur, for example, with the Bell 5ESS system) the tip lead may be allowed to "float" with respect to the ground, and is not tied to the fixed central office ground potential.

In such a case, the central office may interpret its own on hook signal as a "forward disconnect" (because of the floating battery) signal, requiring the remote terminal to open the customer loop. However, in some instances, an on hook signal may simply mean that the customer is using a rotary dial telephone or using a flash book signal (briefly pressing down on the telephone cradle button). Thus; use of a floating ground in the central office precludes the associated subscribers' use of a rotary dial telephone or of the flash hook signal.

Recently, there have been additional requirements for the DLC system to transport voice-bank signals when the telephone is in the on-hook state (with the telephone handset in the cradle). Such requirements include the capability to handle caller identification signals, and to pass open-switching-intervals ("OSI") towards the customer equipment. Such open circuits, or OSIs, are an additional network signaling state that may be used to communicate to customer premises equipment. The requirements for OSIs (also described as Loop Current Feed Open Intervals) are described, for example, in Bellcore Technical Requirement Publication TR-NWT-000057, Issue 2, January 1993, Functional Criterial for DLC Systems, Signalling and Supervision Criteria, paragraph 5.3.10, pages 5–25 to 5–26.

Previously, there existed two specific channel units (within a remote terminal) that were used to transport telephone service. The POTS (Plain Old Telephone Service) channel unit handled residential loop-start applications, and the channel unit handled ground-start applications for business use. The central office terminal (COT) POTS channel unit did provide on-hook transmission and operated with floating switch interfaces, but did not meet the OSI criteria.

The COT Special POTS ("SPOTS") channel unit (with the capability of ground start) also provided on hook transmission, but did not operate with a floating switch interface and did not meet the OSI criteria. COT SPOTS channel units that met the OSI requirements often could not pass rotary dial or hook-flash signals from the customer equipment to the floating switch interface without prematurely disconnecting the call set up sequence.

Thus, ability to pass a hook-flash signal on a floating switch interface and allow OSI signals were frequently mutually exclusive options. A hook-flash signal towards the network was often reflected as an open circuit condition by the COT SPOTS channel unit. This, in turn, would signal the COT to terminate the transmission link between the office equipment and the telephone.

SUMMARY OF THE INVENTION

In a principal aspect, the present invention relates to an interface for use with a digital loop carrier system. The digital loop carrier system includes a customer loop and an office loop. The customer loop includes a telephone with a telephone switch, such that the telephone can be moved from, for example, on hook (open circuit) state, with the telephone handset in the cradle, to an off hook (closed circuit) state, with the handset lifted off the cradle. The customer loop also includes a loop switch that moves between open and closed states. The office loop may, for example, shift modes between a floating ground and a fixed ground.

The interface includes both an office loop switch and a controller. The loop switch is regulated, at least in part, by the controller. Upon being advised that the customer loop is in an open state, the controller opens the office loop switch. If appropriate, the controller then institutes a delay procedure. Accordingly, the controller may wait for a predetermined interval before moving said customer loop to an open state and, thus, terminating any call in progress.

Thus, an object of the present invention is an improved interface for a digital loop carrier system. A further objective is an improved floating ground central office interface that more conveniently passes both flash hook and OSI signals. Yet a further objective is an improved interface that provides greater flexibility in allowing a greater variety of signals to be transported and equipment to be used with DLC systems. These and other objects, features, and advantages of the present invention are discussed or are apparent in the following detailed description.

BRIEF DESCRIPTION OF THE DRAWING

A preferred embodiment of the present invention is described herein with reference to the drawing, wherein.

DETAILED DESCRIPTION OF THE PREFERRED EMBODIMENT

Figure 1:
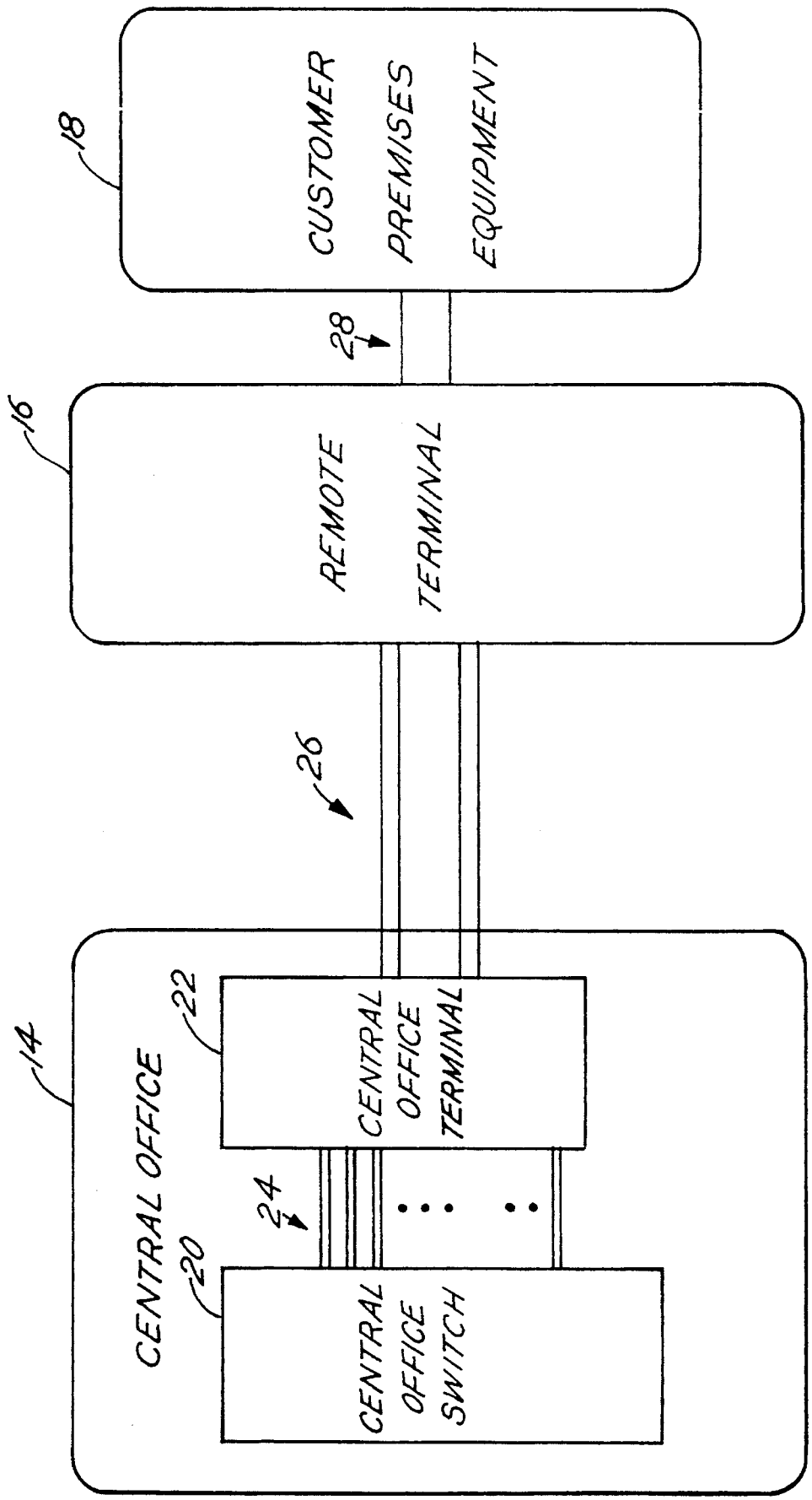
FIG. 1 is a block diagram showing a typical digital loop carrier telephone system.

A preferred embodiment of the present invention will now be described with reference to FIGS. 1 through 3. FIG. 1 shows a typical digital loop carrier system 12. The system 12 includes a central office 14, remote terminal 16, and customer premises equipment 18.

As shown in FIG. 1, the central office 14 includes both a switch 20 and a central office terminal ("COT") 22, as well a series of analog, conductor, tip-ring pairs, or office loops, 24 between them.

The central office switch 20 provides an analog signal, via the office loops 24, to the COT 22. The COT 22 includes a hybrid circuit which converts the signals received and multiplexes them, transmitting them on a digital transmission medium 26 (such as a T1 line) to the remote terminal "RT") 16. The RT 16 then demultiplexes the signal received from the digital transmission medium 26 and provides an appropriate signal, via another analog, conductor, tip-ring pair, or customer loop, 28 to the customer premises equipment 18.

Figure 2:
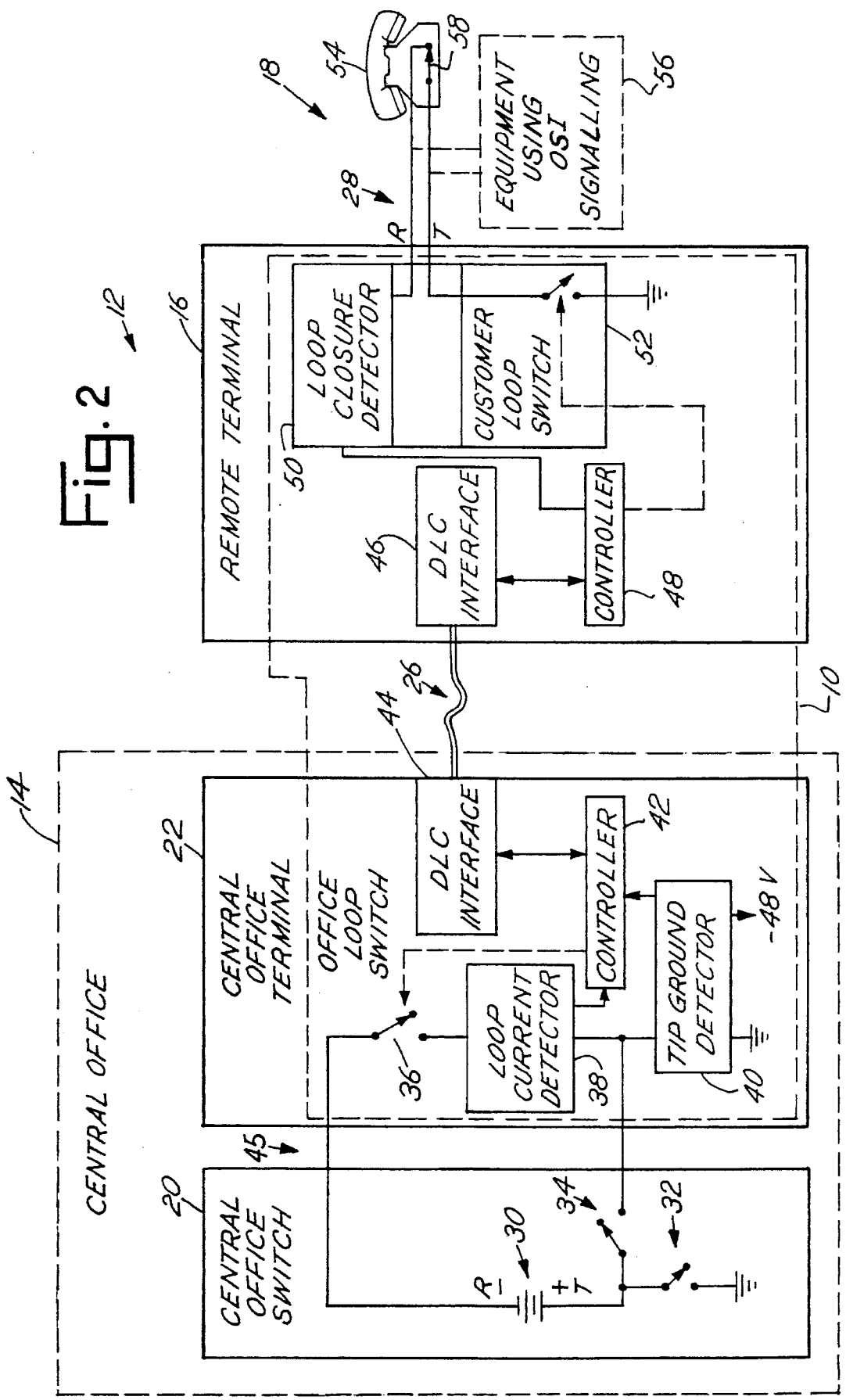
FIG. 2 is a block diagram of a preferred embodiment of the present invention.

Referring now to FIG. 2, an interface 10 for a digital loop carrier system 12 in accordance with the present invention is shown. The central office switch 20 may include a power supply 30, such as, for example, a substantially direct current 48 volt (or 42 to 56 volt) battery, and a ground switch 32 which, when activated, may move the central office switch 20 between fixed ground and floating ground modes of operation with respect to the rest of the central office 14. The central office switch 20 also includes a forward disconnect switch 34.

The central office terminal 22 includes an office loop switch 36, power or loop current detector 38, and tip ground detector 40, all interconnected to an office controller 42, as well as a digital loop carrier interface circuit 44. The power or loop current detector 38 detects current flowing through the office loop switch 36 and provides an appropriate powered or unpowered signal to the controller 42.

The tip ground detector 40 is connected to the forty eight volt power supply 30 (as well as the controller 42 in the central office 14) and checks for a ground connection on the tip lead. It delivers a "grounded" signal to the controller 42 if it detects that the central office switch 20 is operating in a fixed ground mode and provides a "non-grounded" signal otherwise. The substantially DC circuit that includes the 48 volt power supply 30 may be considered an office loop 45.

The controller 42 communicates with the RT 16, which includes a digital loop carrier interface 46, remote controller 48, customer loop closure detector 50, and customer loop switch 52. The RT 16 is interconnected, via the customer loop 28, to the customer premises equipment 18, which includes a telephone 54 and, in some cases, optional equipment 56 that may or may not employ OSI signaling. In the future, such optional 56 equipment might include, for example, a device that will transmit, on demand, a signal representing a home's water usage (or other information) without requiring the telephone 54 to go off hook. The telephone 54 includes a telephone switch 58 that is open or closed (depending on whether the corresponding telephone handset is on or off hook).

If either the telephone switch 58 or the customer loop switch 52 is open, the customer loop 28 is open. If the customer loop 28 is only momentarily open (as occurs during pulse dialing or a flash hook signal), the customer loop switch 52 should generally remain closed, since the call utilizing the telephone 54 may still be in progress. The remote controller 48 is advised by the loop closure detector 50 whether the telephone 54 is on or off hook. Also, since the remote controller 48 regulates the customer loop switch 52, the remote controller 48 is aware of whether the customer loop 28 is open or closed. The remote controller 48 responsively transmits open and closed loop signals to the office controller 42 via the digital medium 26. In response, the controller 42 may adjust the position of the office loop switch 36 so that the open or closed state of the customer loop 28 is mirrored with a similar open or closed state in the office loop 45.

Conversely, when the switch 34 closes and the switch 32 is open, the controller 42 is advised of a loss of tip ground by the tip ground detector 40. If a loss of tip ground is detected and the office loop switch 36 is maintained in a closed condition and no current is detected by the detector 38, the office controller 42 transmits a call interrupt signal to the remote controller 48, such that the remote controller 48 may open the customer loop switch 52.

In other systems, the following events may occur: the central office 14 operates in a floating ground mode and, therefore, the tip ground detector 40 fails to provide a grounded signal to the controller 42; and the remote controller 48 thereafter provides an open loop signal to the controller 42. In such a situation, the situation, the controller 42 might, without the present invention, have difficulty determining whether, for example, a flash hook signal was being sent by the telephone 54 to the central office switch 20 or a forward disconnect signal (switch 34 open) was being sent from the central office switch 20 to the RT 16.

Thus, the disclosed interface 10 includes a COT SPOTS channel unit that provides on-hook transmission, operates with a floating battery, allows hook flash signals to exist, and meets the OSI criteria. The interface 10 thus operates in both POTS and SPOTS applications.

The controller 42 includes an Intel 80C51 microprocessor, which interfaces the detectors and relay circuits to perform all the basic loop call processing functions, including loop closure detection, tip-ground detection, and ring trip.

The interface 10 substantially uses a state-driven method to control the various circuit elements. The general operation of the interface 10 shown in FIG. 2 will now be described. Initially, in the central office switch 20, the central office power supply, or battery, 30 supplies a −48 volt potential on the ring lead, and the tip lead is grounded. The ground connection exists during the on-hook state. The COT 22 has the appearance of an open circuit toward the central office switch 20. The COT 22, however detects the ground potential of the tip lead and passes the state information toward the RT 16. The RT 16, in turn, provides a battery voltage on the ring lead and a ground potential on the tip lead and waits for the customer premises equipment 18 to close the customer loop 28 (which indicates that the telephone 54 has been taken off hook). The customer premises 18, or telephone 54, in turn, has an open telephone switch 58 indicating that the customer premises equipment is in the on-hook state.

When the telephone 54, shown in FIG. 2, goes off hook, the switch 58 closes, and the customer loop 28 draws current. The RT 16 then detects the closure of the customer loop 28 and passes the state information to the COT 22. The COT 22 (through the information provided by the RT 16) then detects the closure of the customer loop 18, and the controller 42 responsively closes the office loop switch 36 to provide closure of the office loop 45 toward the central office switch 20. The central office switch 20 then detects the loop closure made by the COT 22 and provides a dial tone toward the customer premises equipment 18.

At this point with a 5ESS type central office switch 20, the central office switch 20 also removes the tip ground by opening the ground switch 32 and provides a floating battery toward the COT 22. The loop current detector 38 in the COT 22 accordingly detects the loop current in the office loop 45 and provides a powered signal to the controller 42. Furthermore, the tip ground detector 40 provides a non-grounded signal to the controller 42 instead of a grounded signal but the central office terminal 22 continues to provide a grounded tip state toward the remote terminal 16. The RT 16 continues to provide a battery voltage toward the customer premises equipment 18, and the customer premises equipment 18 continues to draw current.

If at this point, for example, the customer uses a flash hook signal, the customer premises equipment 18 breaks the loop current by, for example, rotary dialing or hook flashing. The loop closure detector 50 in the RT 16 then detects the loop current break, and the remote controller 48 responsively passes such open loop information, via the digital medium 26, to the controller 42. The controller 42 detects the open loop information sent by the remote controller 48 and duplicates the same effect by opening the office loop switch 36. Accordingly, the central office switch 20 receives the information that there is an open customer loop and accepts the open loop information as valid.

Contemporaneously with sensing the loss of current in the office loop, however, the controller 42 disables the OSI information (that there is an open office loop and no grounded signal) from being transmitted toward the remote controller 48. The remote terminal 16 detects the tip ground state from the network and continues to provide battery feed towards the customer premises equipment 18. Thus, the grounded tip state of customer loop 28 is maintained for a predetermined interval, even though the controller 42 can not be certain that a forward disconnect is not occurring.

Accordingly, the remote controller 48 may temporarily receive a phantom signal from the office controller 42, suggesting that it is not aware that there is a lack of a powered signal and a lack of a grounded signal. This temporarily prevents the remote controller 48 from opening the customer loop switch 52 and unnecessarily disrupting any call in progress.

In one embodiment, the predetermined interval may be within a range of 50 milliseconds to 5 seconds. In a more preferred embodiment, the interval is in a range of 1 to 2 seconds or, even more preferably, is 1.6 seconds, since a flash hook is often defined as a customer loop break of less than 1.6 seconds. Thus, the controller 42 waits an interval of 1.6 seconds before advising the remote controller 48 to open the customer loop switch 52 and, thus, break off any call in progress. This time interval may be found, for example, in the Bellcore Technical Requirement Publication TR-NWT-000057 referred to above.

Notably, the delay procedure instituted by the controller 42 does not occur in all instances of a customer loop break, regardless of whether the break is of a long or short duration. In the preferred embodiment, the delay procedure is instituted only, for example, when the tip ground detector 40 cannot detect a fixed ground, such that the central office switch 20 may have moved to a floating ground mode of operation.

If a fixed ground is detected and the controller 42 is advised of an open customer loop 28 by the remote controller 48, the controller promptly opens the office loop switch 36 (but does not instruct the remote controller to open the customer loop switch 52). Further, if no ground is sensed by the controller 42, the office loop switch 36 is closed and the loop current detector 38 fails to detect current, the controller 42 promptly advises the remote controller 46 to open the customer loop switch 52 without instituting the delay procedure. ("Promptly" may be understood, for example, to be within 25 milliseconds, as defined by the Bellcore Technical Requirement Publication referred to above.)

Similarly, in the preferred embodiment, in order to institute the delay procedure, the controller 42 must receive a powered signal from the current detector 38 just prior to opening the office loop switch 36, such that the controller 42 knows that the switch 36 was receiving power at least shortly before the controller 42 opened the switch 36. If there is no current through a closed switch 36, together with an open customer loop, the office controller 42 promptly advises the remote controller 48 of the exact condition of the tip ground and loop current detectors 40, 38 without instituting the delay procedure.

Figure 3:
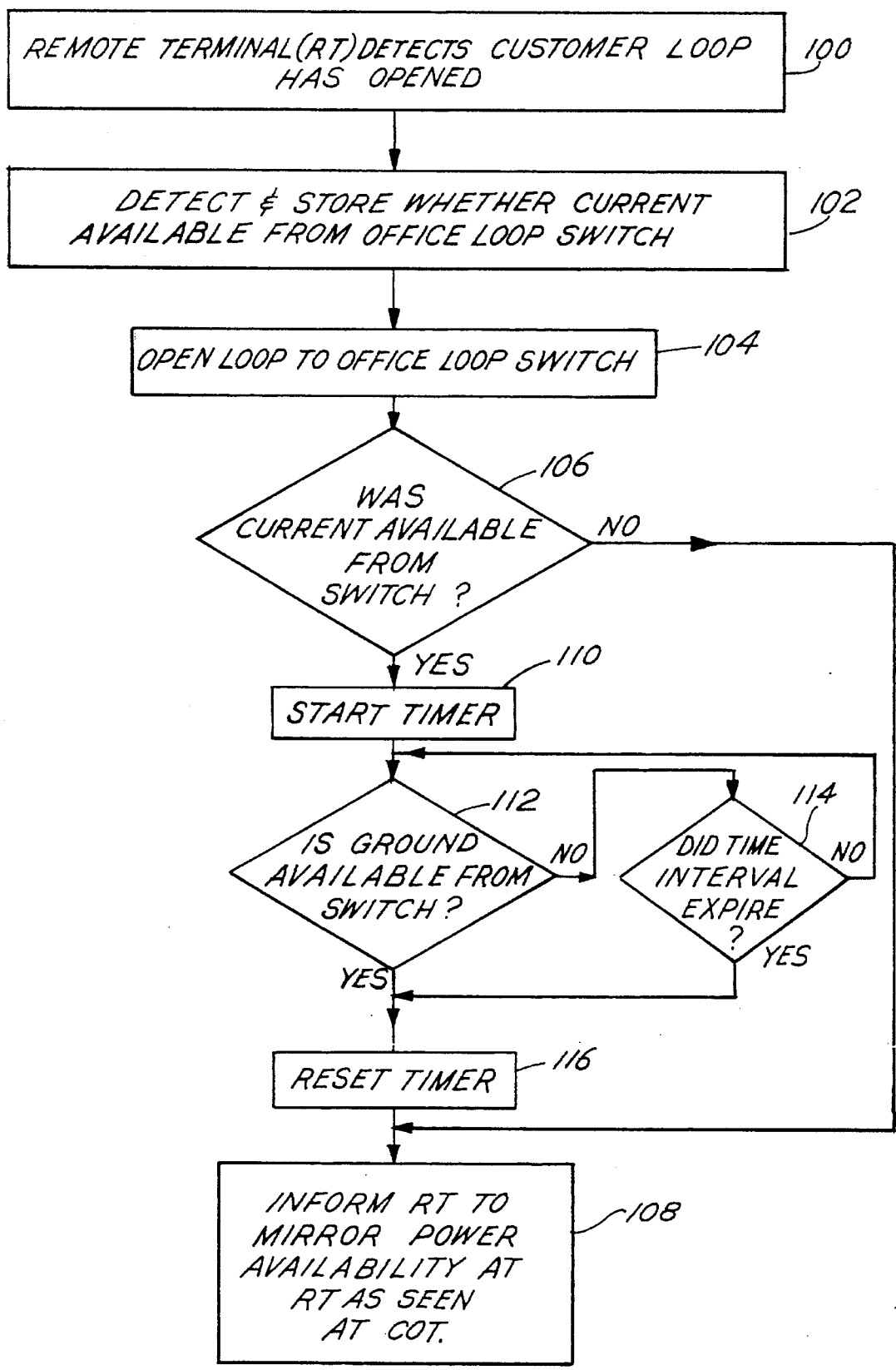
FIG. 3 is a flow chart showing the process used by the office controller shown in FIG. 2.

A flow chart showing the general outline of the decisions made by the office controller 42 is shown in FIG. 3. At step 100, the controller 42 determines whether the RT 16 has detected that the customer loop 28 has opened. If so, at step 102, the controller 42 notes and stores whether the loop current detector 38 is providing a powered or unpowered signal to it. A powered signal indicates that (just prior to the opening of the switch 36 by the controller 42) current is flowing through the switch 36.

At step 104, the controller 42 opens the office loop switch 36 and, at step 106, recalls whether current was flowing through the switch 36 at step 102. If not, at step 108, the controller 42 informs the RT 16 that it should open or close the customer loop switch 52 according to whether the office loop 45 is open or closed. With the switch 36 open, any call will thus be disconnected.

If current was flowing in step 102, then, at step 110, the controller 42 starts an interval timer. As shown in steps 112 and 114, as long as the controller 42 continues to receive an ungrounded signal from the detector 40, the timer continues until the end of the interval is reached. At the end of the interval, the controller 42 resets the timer, at step 116, and, at step 108, again informs the remote controller 48 that it should have the RT 16 mirror the power availability at the COT 22. Importantly, the interval timer is used to delay informing the RT 16 to open the switch 52 for the interval time.

Although the foregoing description of the preferred embodiment will enable a person of ordinary skill in the art to make and use the interface, the following detailed source code listing in the C language for the microprocessor is included. The source code listing provides a detailed information concerning the operation of the overall system and additional detailed features of the interface will become apparent to those skilled in the art from reviewing the program.

A preferred embodiment of the present invention has been described herein. It is to be understood, however, that changes and modifications can be made without departing from the true scope and spirit of the present invention. This true scope and spirit are defined by the following claims and their equivalents, to be interpreted in light of the foregoing specification.

We claim:

1. An interface for a digital loop carrier system, said system including a customer loop and office loop, said customer loop including a telephone and a customer loop switch, said telephone including a telephone switch moving between on hook and off hook states, and said customer loop switch defining open and closed states, both said on hook state of said telephone switch and said open state of said customer loop switch able to place customer loop in an open state, said interface comprising, in combination:

an office loop switch in said office loop;

an office controller for detecting said open state of said customer loop, responsively opening said office loop switch, and instituting a delay procedure, said delay procedure including said office controller waiting a predetermined interval and, when said customer loop remains in said open state, opening said customer loop switch; and a ground detector for detecting when said office loop is grounded and non-grounded and responsively providing grounded and non-grounded signals to said controller and wherein said controller institutes said delay procedure only upon receiving said non-grounded signal upon opening said office loop switch.

2. The interface as claimed in claim 1 further comprising a power detector for detecting current through said office loop switch and responsively providing a powered signal to said office controller and wherein said office controller institutes said delay procedure only upon receiving said powered signal prior to opening said office loop switch.

3. The interface as claimed in claim 2 further comprising a remote controller for detecting said open and closed states of said customer loop and for conveying open and closed loop signals to said office controller and wherein said office controller responsively opens and closes said office loop switch.

4. An interface for a digital loop carrier system, said system including a customer loop and office loop, said customer loop including a telephone and a customer loop switch, said telephone including a telephone switch moving between on hook and off hook states, and said customer loop switch defining open and closed states, both said on hook state of said telephone switch and said open state of said customer loop switch to place said office loop in a fixed ground mode and a floating ground mode, said interface comprising, in combination:

an office loop switch in said office loop;

a power detector for detecting current through said loop switch and responsively providing powered and unpowered signals;

a ground detector for detecting when said office loop is grounded and ungrounded and responsively providing grounded and non-grounded signals;

a remote controller for sensing an open state of said customer loop and providing an open customer loop signal and for receiving a disconnect signal and opening said customer loop; and an office controller for receiving said customer loop signal, responsively opening said office loop switch, and instituting a delay procedure, said delay procedure including said office controller waiting a predetermined period of time and, when said customer loop remains in said open state, transmitting a disconnect signal to said remote controller, and said controller only instituting said delay procedure upon receiving said non-grounded signal upon opening said office loop switch and upon receiving said powered signal prior to opening said loop switch.

5. The interface as claimed in claim 4 wherein said predetermined interval is an interval of time between 50 milliseconds and 5 seconds.

6. The interface as claimed in claim 5 wherein said predetermined interval is approximately 1.6 seconds.

* * * * *